United States Patent [19]

Heitzman-Powell et al.

[11] Patent Number: 4,865,380

[45] Date of Patent: Sep. 12, 1989

[54] UNIVERSAL PORTABLE SEAT CUSHION W/RETRACTABLE SUNSHADE DEVICE FOR SEATED-PERSON

[76] Inventors: Linda S. Heitzman-Powell; Edna Mae Heitzman, both of 1050 Frayne Dr., New Carlisle, Ohio 45344

[21] Appl. No.: 136,131

[22] Filed: Dec. 21, 1987

[51] Int. Cl.[4] .................. A47C 7/66

[52] U.S. Cl. .................. 297/184; 5/418; 135/96; 248/161; 248/411; 297/219; 297/231; 297/255; 297/350

[58] Field of Search .................. 297/17, 184, 191, 218, 297/219, 225, 231, 254–256, 351, 352, 452, 485; 248/104, 160, 161, 411; 5/418, 432; 135/16, 96

[56] References Cited

U.S. PATENT DOCUMENTS

| | | | |
|---|---|---|---|
| D. 261,843 | 11/1981 | Wall | D6/191 |
| D. 288,757 | 3/1987 | Hoeckel | D6/491 |
| 442,629 | 12/1890 | Lipscomb | 297/191 X |
| 1,882,169 | 10/1932 | Wedler | 297/219 |
| 1,890,696 | 12/1932 | Rosenhahn | 248/160 X |
| 2,108,531 | 2/1938 | Flanders | 297/352 X |
| 2,534,009 | 12/1950 | Freasier et al. | 297/231 |
| 2,561,886 | 7/1951 | Rikelman | 297/184 X |
| 2,667,913 | 2/1954 | Dustin | 297/252 X |
| 2,784,261 | 3/1957 | Anklesaria | 248/160 X |
| 3,066,980 | 12/1962 | Clute | 297/352 X |
| 3,829,113 | 8/1974 | Epelbaum | 297/254 X |
| 4,109,322 | 8/1978 | Ott | 2/177 |
| 4,239,278 | 1/1979 | Skilliter | 296/97 F |
| 4,293,162 | 10/1981 | Pap | 297/184 |
| 4,583,779 | 4/1986 | Myers | 297/184 |
| 4,583,780 | 4/1986 | Flnn | 297/184 |
| 4,641,883 | 2/1987 | Kato | 297/184 |

FOREIGN PATENT DOCUMENTS

| | | | |
|---|---|---|---|
| 1417654 | 10/1965 | France | 135/96 |
| 426174 | 10/1947 | Italy | 5/418 |
| 570798 | 12/1957 | Italy | 297/184 |
| 13454 | of 1908 | United Kingdom | 135/96 |
| 735540 | 8/1955 | United Kingdom | 297/17 |

*Primary Examiner*—Peter R. Brown

[57] ABSTRACT

A speciality convenience device comprising a U-shaped framework of rigid-tubing, serving to both house and support an extensible flexible-gooseneck member capable of being manually omni-adjusted into any desired positional attitude; the device being substantially flat between legs of said U-frame so as to be easily installed upon an existing automobile's or spectator-bench's seat back, while thus held captive thereto by presence of the user's own back resting thereupon; the user being either an adult or juvenile by virtue of a special U-frame width-adjustment provision which includes a co-operative sizing-adjustment of the back-spanning fabric covering; the covering including a pocket-like formation thereto also facilitating a convenient stowing place for the gooseneck's detachable sunshield member, including provision of a sunshield folding capacity, as well as an optional attachable child's activity-center thereto.

10 Claims, 3 Drawing Sheets

FIG. 4
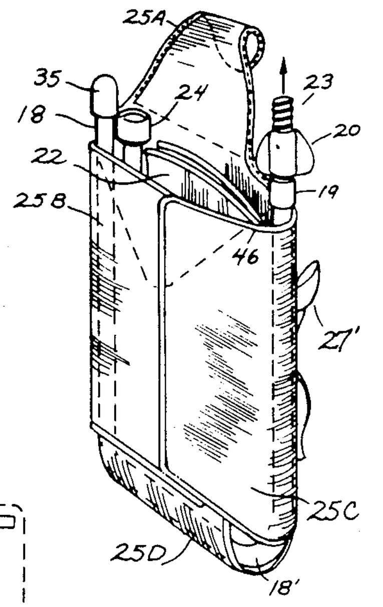
FIG. 3
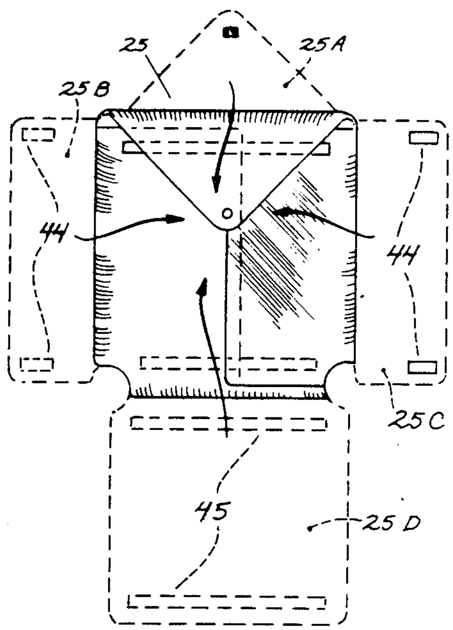
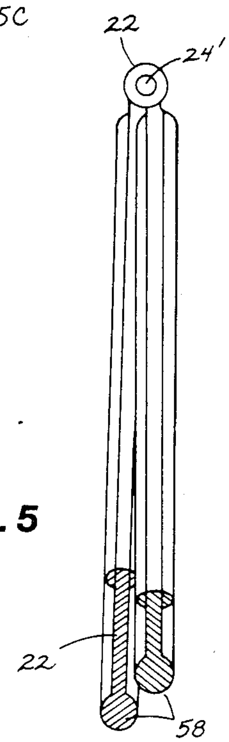
FIG. 5

UNIVERSAL PORTABLE SEAT CUSHION W/RETRACTABLE SUNSHADE DEVICE FOR SEATED-PERSON

FIELD OF INVENTION:

This invention relates generally to devices made to offer the user comfort from the heat and glare of the sun while the user is situated in a seated position.

BACKGROUND OF THE INVENTION:

While there are various types of visored-hats for the spectator, as well as automobile windshield and side-window visors of both standard equipment and after-market variety, offering some degree of relief from sun heat and glare, this invention seeks to provide a closer positioned sun-shielding means which is discovered to be more effective in protecting one's head and upper-body region when the other known means are not either available or particularly effective. For example, external automotive sunvisors are today not generally considered very attractive nor aerodynamic, while interior sunvisors may not afford ample protection, or may dangerously obscure the drivers vision. Furthermore, a youngster or infant is poised in a relatively lower attitude in relationship to the vehicle's roof and window-openings, and is therefore considerably more subject to heat and radiation overexposure, since a greater percentage of their body is thus being exposed, particularly the more sensative head region, as compared to an adult. Likewise, at a sporting-event for example, an adult may suffer from similar exposure to the adverse effects of sun-radiation, since their entire upper-body region is subjected to heat and ultraviolet radiation. Hence, it was determined that a simple, low-cost, portable sunshade device would be of real utilitarian value.

SUMMARY OF THE INVENTION:

With the foregoing factors in mind, it is an object of this invention to set forth a special universal portable seat-sunshade apparatus for child or adult convenience, wherein is provided a simple rigid tubular U-frame supporting member of either round or square tubing cross-section, having two substantially vertical and parallel leg-bifurcations stemming approximately equidistant up from a common laterally oriented mid-portion while the invention is stationed for use.

Another object of this invention is to set forth a sunshade apparatus having a substantially standard flexile gooseneck member, which would serve to support a distally extended sunvisor member in most any manually adjusted attitude with respect to extension, azimuth, and elevation, relative to the user and to the sun.

Another object of this invention is to set forth a sunshade apparatus wherein the U-frame gooseneck may be manually retracted into the U-frame as may be desired to limit extension therefrom, or, as may be desired for a very compact 'stow' modality; and whereby in said stow-mode, the said gooseneck sunvisor member may be provided with a special male/female threaded-shank portion enabling the sunvisor component, together with half the said threaded aggregation, to be removed entirely for conveniently compact storing seperately from the gooseneck, but immediately inside a hand stow-pocket created between the said U-frame leg units; moreover, it is desired to include a manual-locking arrangement for fixing the retractile position of the gooseneck relative to the U-frame, via a special fixed male-sleeve affixed to one of the said U-frame leg tips, whereby said sleeve includes a short threaded final having a tapered formation with axial or longitudinally running slot-reliefs made therein, which enable the shank to close in tightly upon the said gooseneck body when a co-axial female hand-nut member is firmly tightened thereupon.

Another object of this invention is to set forth a sunshade apparatus having a U-frame main structure optionally provided with a laterally telescoping mid-portion, including a finger released spring-loaded detent-pin upon the outside sliding portion which is capable of selectively engaging one of a plurality of pin/index-holes, thereby enabling the U-frame assembly to be conveniently expanded or contracted according to the user's particular back width.

Another object of this invention is to set forth a sunshade apparatus having a U-frame supporting structure, whereby the U-frame is preferably covered with a suitable fabric material which may be of a die-cut pattern size and configuration capable of spanning between both sides of the U-frame legs, which forms a double-wall arrangement tantamount to a stow-pocket affair; the covering material may include a sandwich like construction of foam-padding therewith, thereby both offering added protection to the object placed into the stow-pocket, as well as comforting padding for the seated user's back to lean against. Also, it is desired to provide an additional lower seat-pad component as an option, which may simply be an extension of the previously described U-frame covering provision, or, may be removably attached via Velcro® or other type of quick fastener means such as ordinary button-snaps which will enable the lower/seat-cushion member to be readily attached/detached at will or according to the pricing level of the end product on a retail level. The lower-cushion would naturally include a layer of 1"-foam held within top and bottom layers of the fabric covering material, and hence, would be simply jointed at the attachment point so as to facilitate a usual 100-degree folding swing from a flat-folded condition to a normal seating use condition.

Another object of this invention is to set forth a sunshade apparatus wherein is included a tie-down strap affair consisting of a tie-cord of plastic or cloth which may be attached to the U-frame covering material at opposite lateral sides so as to facilitate the convenient lashing of the U-frame sunshade assembly to the setback of an automobile/passenger seat for example; so that when the seated user moves away, the U-frame assembly remains intact in the proper upright position without having to be fussed with. The two seat-ties may be joined at the car-seatback rear area via readily adjustable Velcro® or equivalent mechanical fastening means, or merely secured in tie-string fashion.

Accordingly, this invention will be further described in conjunction with certain preferred embodiments, hence, it is intended that the invention as is set forth herein will not be limited to such specific features; on the contrary, it is intended to cover all associated alternatives, modifications, and equivalents which may be found within the spirit and scope of the invention, as is further defined in the following Specification.

BRIEF DESCRIPTION OF THE DRAWINGS:

FIG. 3, is a flat projection view of the basic die-cutting pattern configuration provided for the basic frame covering; and includes a two-position condition, with the pre-folded condition being in phantom outline for clarity.

FIG. 4, is an oblique right side perspective view of the invention as it appears in a fully retracted stow condition.

FIG. 5, is an enlarged end-view of the folded sunvisor component of the invention, wherein a portion of the object is revealed in cutaway fashion for added clarity.

Figure 1:
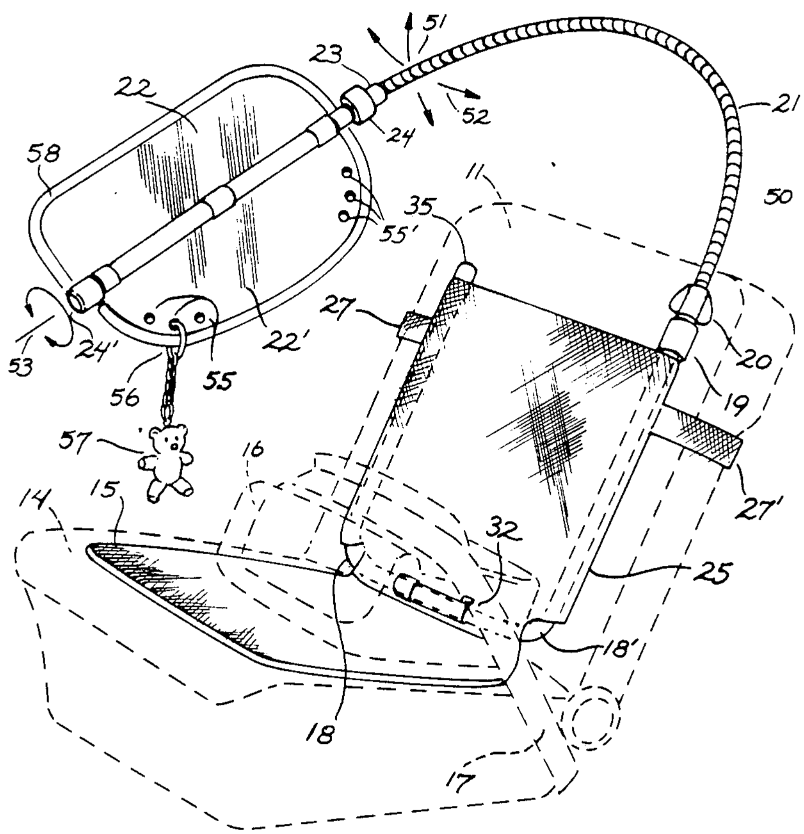
FIG. 1, is an overall pictorial view of the invention as it appears installed in an automobile for example, wherein is shown both an adult and a child in phantom dotted-line delineation, as well as an exemplified car-seat in phantom outline as well; plus, included are five indicated reference legends for understanding of the various adjustment provisions.

SPECIFICATION OF THE PREFERRED EMBODIMENT:

Reference to FIG. 1 reveals how the complete sunshade apparatus 10 is set in place between the car-seat-back 11 and the occupants own back, which may be an adult person 12 or an infant 13, either of which is sitting upon the existing car/seat-bottom 14, or upon the optional seat/bottom-pad 15 thereto; although in the case of the infant 13, a nationally required conventional safety-seat 16 is also indicated, along with the standard car-safetybelt 17 suitable for use by either of said occupants. Other primary features of FIG. 1 include the special U-frame 18/18', the special sleeve-clamp 19 with attendant handnut 20 and co-axial gooseneck 21 to which is attached a sunvisor 22/22' via male/female threaded fittings 23/24 respectively. Also showing, is the U-frame backpad-covering 25 which includes an optional seatpad 15 and seatback/tiedown-strap 27/27'. Plus, a special optional width-adjustment device is provided herein, which is more clearly seen in FIG. 2, wherein leaf-spring 30 is affixed to outside U-frame tube member 18 via a wrap-around portion 31, thereby positioning the spring biased detent-pin 32 through the alignment-hold 33 and into an adjoining index-hole 34/A which is in line with the other index-holes 34/B and 34/C thereto; hence, enabling the U-frame to be manually expanded, or contracted to the narrow width setting shown, resulting in a positive telescoping-section arrangement which is at once both durable and inexpensive.

Figure 2:
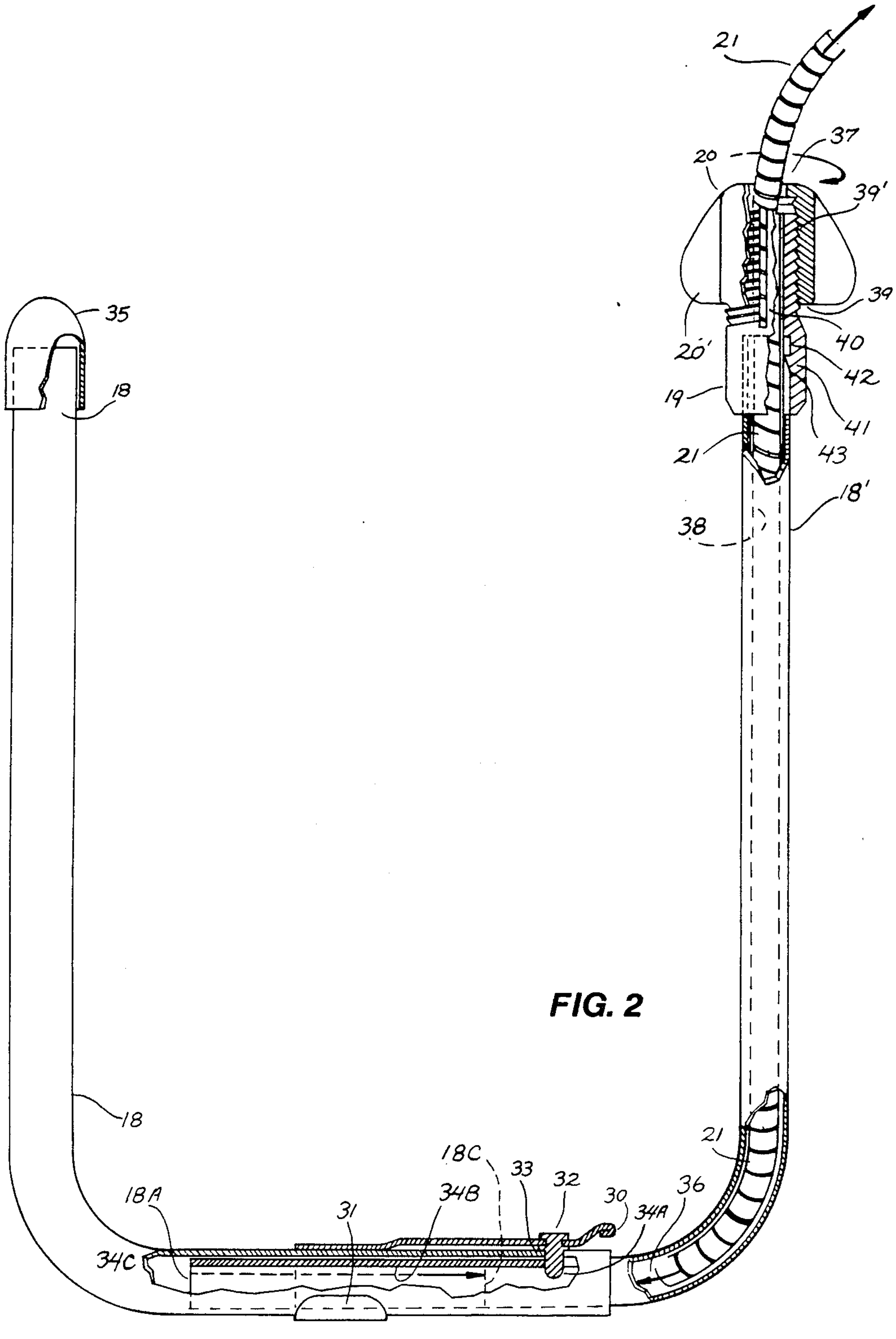
FIG. 2, is a flat-project frontal elevation-view of the invention shown in partial cutaway condition for improved clarity; including a lower reference-arrow indicating a variable positioning capability thereto.

Still further features of the invention as set forth in FIG. 2 is the outer-tube final-cap 35, while the portion of tubing just below is shown somewhat abbreviated and in cross-section showing the preferred round tubing, although a square type of tubing would sulfice as well. The lower right-hand side of the U-frame is in cutaway revealing the slide-tip 36 of the gooseneck 21 which is seen making a bending passage there through by virtue of its natural flexural quality as is similarly suggested at the outlet 37 where the gooseneck is indicated to be bent over in the opposite direction, or as may be desired, since there is no physical restriction to its disposition once outside of the rigid U-frame member. Furthermore, it can be seen how axial slittings 40 made into the sleeve-clamp 19 along with the tapered-threads 39/39' (male/female) enable the handnut 20 having winglets 20' to quickly tighten the gooseneck 21 in any given degree of extension or retraction. Also note that the said sleeve-clamp 19 is preferably made of injection-molded engineering plastic construction, and includes a simple tube-catch entity 41 which permanently affixes the sleeve upon the left-hand leg-tip 42 via locater-hole 43.

Study of FIG. 3 reveals a basic format for the die-cut fabric comprising the backpad 25, wherein portions 25'/A,B,C,D thus merely fold around the U-frame at sides and bottom, with 25'/A forming a flap covering the thus formed internal pocket cavity; with the various folded portions having Velcro ®/hook-strips mating upon Velcro ®/loop-strips 44 and 45 respectively.

Next, FIG. 4 views the basic arrangement of the invention as it appears in the compactly folded and retracted condition, such as would be fully portable to carry into a public-stadium for one's own sunshade comfort; and wherein may be seen the detachable sunvisor 22 in a folded mode, as is further exemplified in FIG. 5, whereby a very compact package is attained. Notice also, that the cross-section reveals a preferred full-round safety-edging, which is integrally molded around the perimeter of the preferably smokey-grey Lexan ® plastic visor. Also observe how the gooseneck member 21 has been fully retracted into the U-frame, whereupon the sunvisor 22/22' has been manually detached via male/female shank-couplings 23/24 respectively, leaving only the closing of cover-flap 25/A over receiver-pocket 46 to effect a securely contained assembly.

Operation as to positioning of the sunvisor 22 during outward deployment is best understood in FIG. 1, wherein it may be readily seen that by first adjusting the distal-extension according to Ref.-point 50 and locking of wingnut 21, the gooseneck may then be easily oriented as desired in elevation Ref.-point 51 and azimuth Ref.-point 52, while the flexural quality of the gooseneck also affords easy rotation of the sunvisor axially along Ref.-point 53, while the 2-piece sunvisor construction also allows secondary adjustment of section 22' to achieve a modified shape from that of a flat-panel shown.

Additionally, since infants become quite bored during motortrips of any length, special provision of several edge-attachment holes 55 allow the use of various hook-on connectors such as fishing-lure type swivel clasps 56 to be employed in freely suspending play articles, such as the exemplified toy-bear 57; thus creating a manner of 'entertainment-center' to captivate the infants attention as well animated via natural vehicle motion in conjunction with the cantilever flex of the gooseneck. The quick-detachment/attachment arrangement easily enabling the sunshade invention to be rapidly restored to adult use when desired, particularly for outdoor sports spectators who will again find the said edge-attachment holes 55/55' can be advantageously employed to easily suspend an antenna-wire for added reception from their personal TV-set to many now find handy to view 'instant-replays' of sports events.

In the drawings and specifications there has been set forth the best mode presently contemplated for the practice of the present invention, and although specific terms are employed, they are used in a generic, if descriptive, sense only and not for purposes of limitation upon the spirit and scope of the invention, as is next defined in the claims.

We claim:

1. A hand-portable utility sunshade apparatus for a single seated adult or small child, to be installed where exists a substantially upright back-support such as may be provided by an automobile-seat or outdoor spectator-seat installation for example, whereby objectionable sun-glare may be effectively blocked out at most any azimuth and elevation attitude within the sector between the sun or sun-reflection and the user; comprising:

a tubular U-frame member, having two substantially vertical and parallel leg-bifurcations stemming approximately equidistantly up from a common laterally oriented mid-portion;

a flexile gooseneck member of substantially standard construction, arranged as an extension of only one U-frame leg's upward projection, so as to facilitate convenient manually repositionable attitude orientation both as to azimuth and elevation;

distal sunvisor member outwardly supported from the said gooseneck member, and provided with a rotatable stem portion acting co-axially with the axis of the said gooseneck;

a flexible back-pad member having flap like portions which are suitable wrapped about the said U-frame, serving to positively hold the aggregate sunshade apparatus in a fixed station once the user's back is rested thereto.

2. In a special sunshade apparatus according to claim 1, wherein said tubular U-frame member may be round or square in cross-section, and provided with telescopic adjustment means at its mid-portion, whereby the U-frame mid-portion may be expanded or contracted according to the back width of the user.

3. A U-frame member according to claim 2, wherein said mid-portion telescopic adjustable means includes a manually adjustable spring-detent latching device engagable with a plurality of positive index detent-holes so as to selectively facilitate said width adjustability.

4. A width adjustment according to claim 3, wherein said spring detent latching device includes a leaf or equivalent type of spring medium, whereby the said latching device is held detainably into one of said plurality of index detent holes.

5. In a special sunshade apparatus according to claim 1, wherein said back-pad member is fabricated from natural or synthetic material such as a woven-fabric via conventional sewing or ultra-sonic fusing, and so arranged in pattern as to substantially envelope the said tubing about its perimeter while spanning between said U-frame legs on both sides so as to create a pocket entity thereto for protective stowing of the sunvisor member; said sunshade apparatus including a fold-down seat-cushion member having a top and bottom layer of fabric sandwiching a layer of foam-padding material, said seat-cushion member connected along one edge to said back-pad member by means of a flexible joint thereby being capable of laying compactly against the said back-pad or being folded about 100-degrees downward for sitting upon.

6. A special U-frame back-pad according to claim 5, wherein said back pad member comprises twin-lateral side flaps which are folded around the opposed legs and are equipped with an adjustable fastening means such as a hook and loop or equivalent type fastener type of device, whereby the attachment of the twin lateral side-flaps of the fabric-cover material may be laterally adjusted to thereby accomodate different U-frame widths simply by repositioning the mating fasteners.

7. In a special sunshade apparatus according to claim 1, wherein said gooseneck is preferably made so as to be adjustably extensible from within the U-frame's tubular body via a manual adjustment means, while likewise also being substantially retractable to within said tubing body; hence facilitating any particular distal positioning of the sunvisor member attached thereto.

8. An extendable gooseneck device according to claim 7, wherein said adjustment means includes a collar member having a portion fixed to the stationary U-frame leg portion and which includes a slightly tapered threaded extending portion having a plurality of axial slots there-in, and a likewise hollow center portion through which passes the attendant gooseneck body; and a manually tightened handnut member with matching threads is applied upon the said collar, thereby causing the tapered threading to cinch down and force the slotted extending portion to close with such force as to frictionally detain the otherwise sliding gooseneck body at any desired length.

9. A sunshade apparatus according to claim 1, wherein said sunvisor member may be of two-piece construction divided into substantially two halves sharing a common jointed axis that lies along an axial extension of the gooseneck supporting member, enabling the visor to be folded upon itself if desired.

10. A sunshade apparatus according to claim 1, wherein said sunvisor includes a plurality of simple hole-reliefs at the outer-rim region, thereby facilitating convenient attachment of various freely suspended accessory articles, such as infant entertainment objects, or, a TV-antenna for spectator use.

* * * * *